(No Model.) 4 Sheets—Sheet 2.
A. V. ABBOT & F. C. F. KNAAK.
CENTRAL STATION HEATING SYSTEM.
No. 387,201. Patented Aug. 7, 1888.
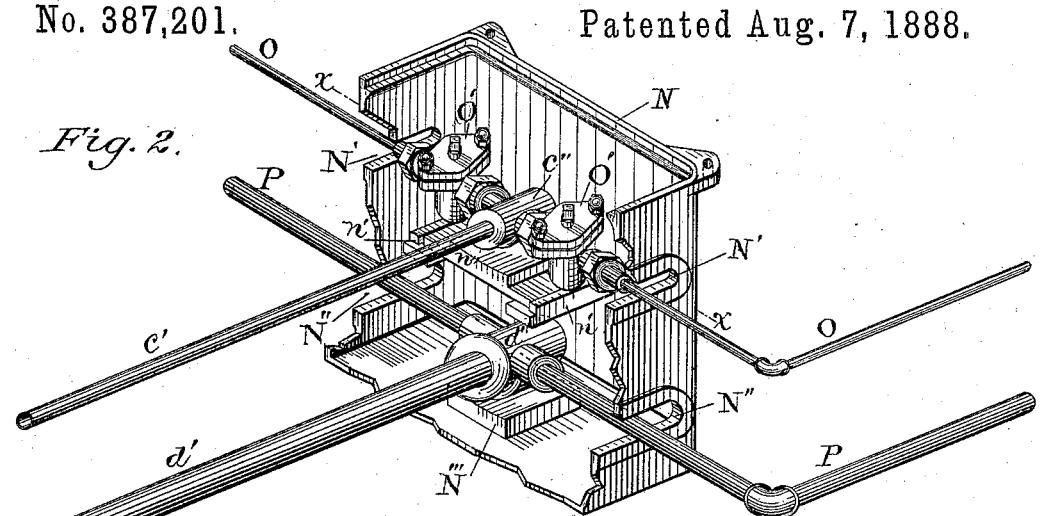
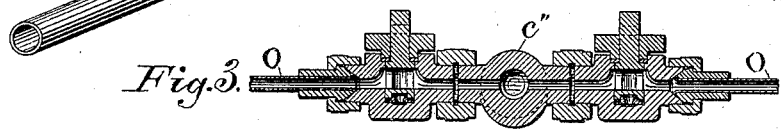
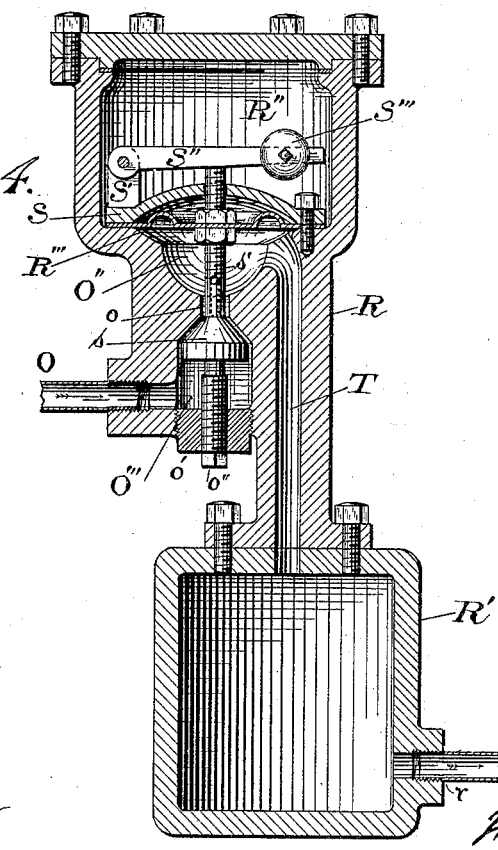
WITNESSES:
INVENTOR.
BY
ATTORNEY.

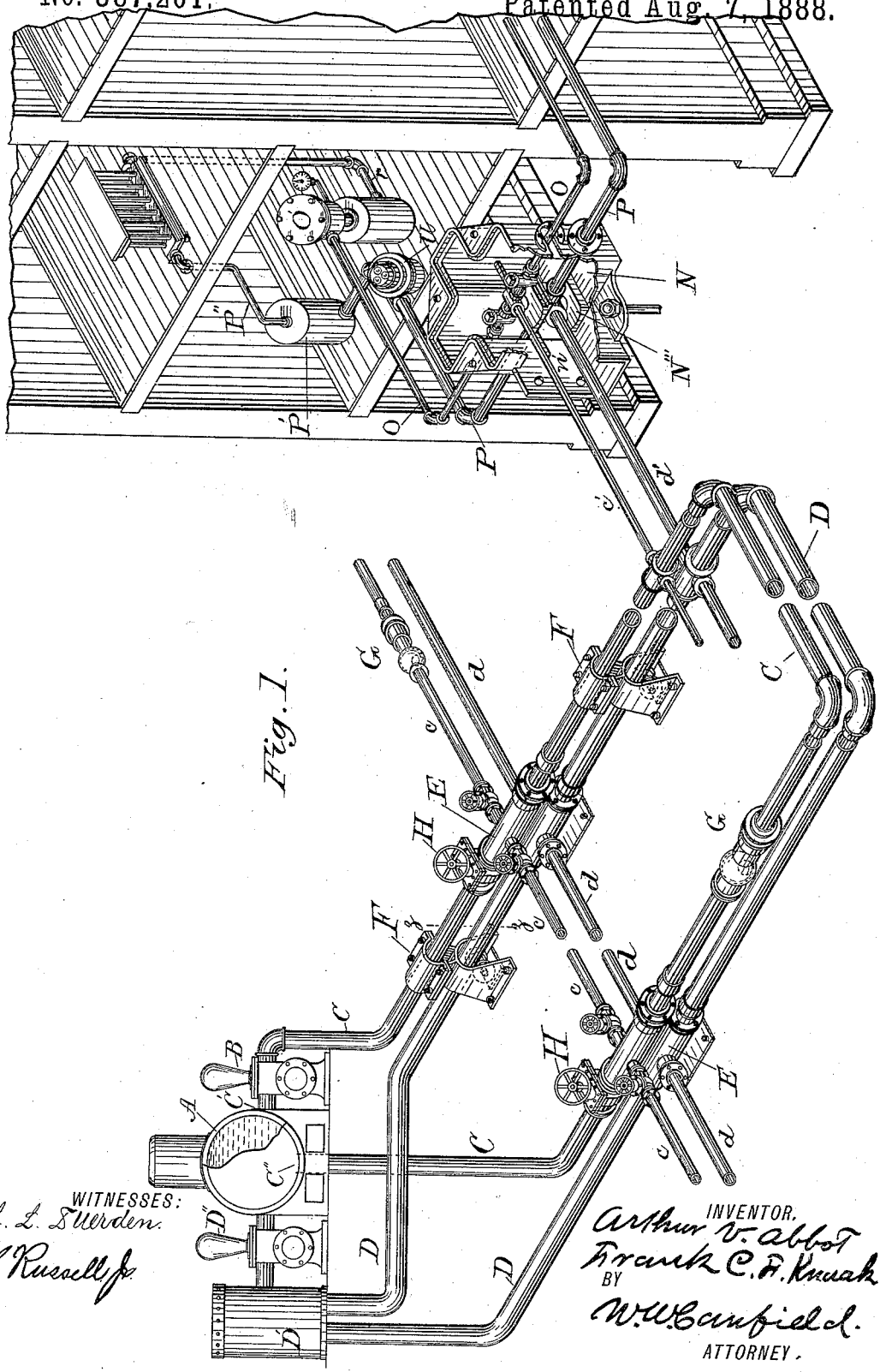

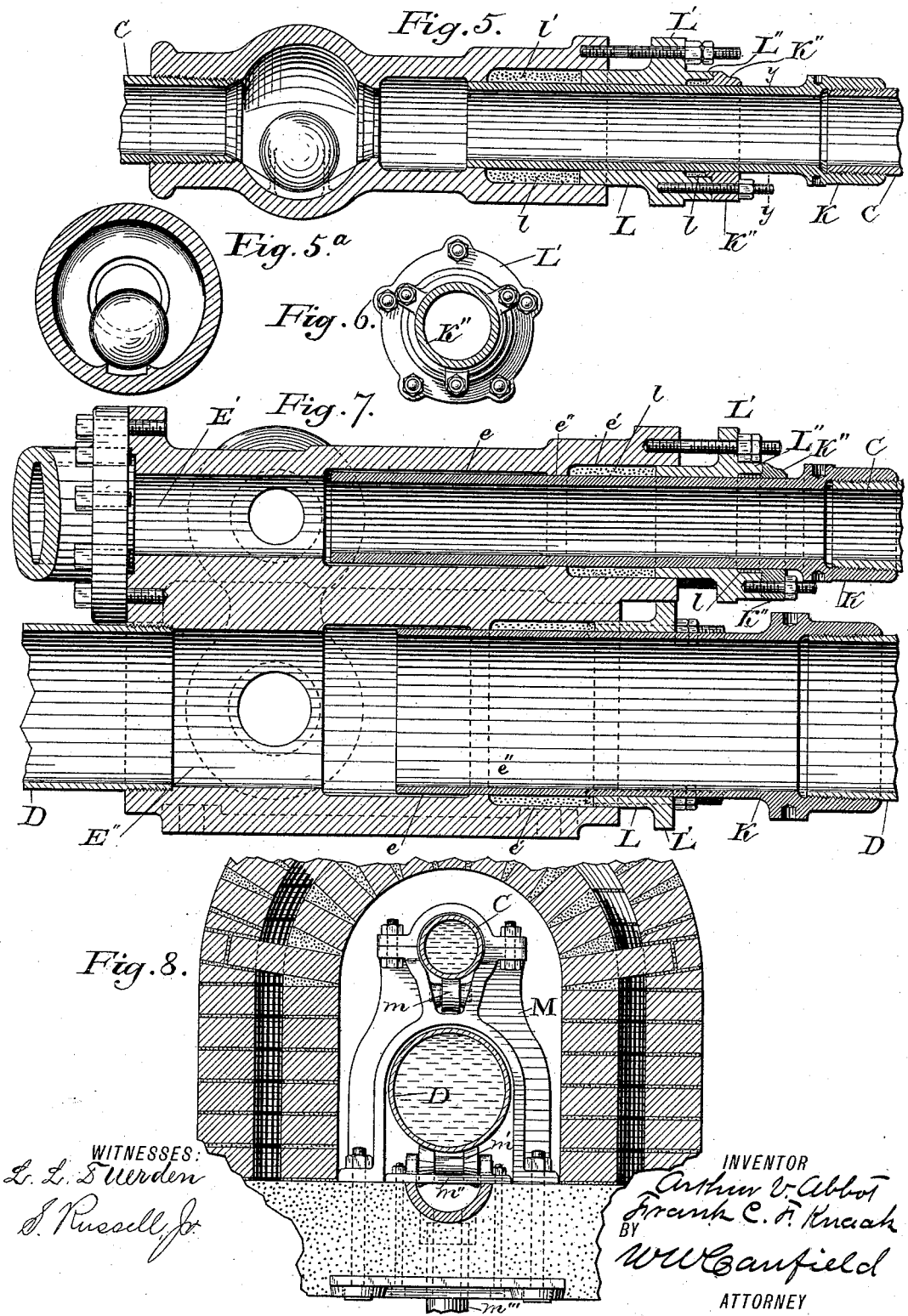

(No Model.) 4 Sheets—Sheet 4.

A. V. ABBOT & F. C. F. KNAAK.
CENTRAL STATION HEATING SYSTEM.

No. 387,201. Patented Aug. 7, 1888.

WITNESSES:
L. L. Swerden.
S. Russell Jr.

INVENTOR.
Arthur V. Abbot.
Frank C. F. Knaak
BY
W. W. Canfield
ATTORNEY.

United States Patent Office.

ARTHUR V. ABBOT, OF CLOSTER, NEW JERSEY, AND FRANK C. F. KNAAK, OF NEW YORK, N. Y., ASSIGNORS, BY MESNE ASSIGNMENTS, TO THE NATIONAL HEATING COMPANY, OF NEW YORK, N. Y.

CENTRAL-STATION HEATING SYSTEM.

SPECIFICATION forming part of Letters Patent No. 387,201, dated August 7, 1888.

Application filed August 27, 1887. Serial No. 248,000. (No model.)

*To all whom it may concern:*

Be it known that we, ARTHUR V. ABBOT, of Closter, in the county of Bergen and State of New Jersey, and FRANK C. F. KNAAK, of the city, county, and State of New York, citizens of the United States, have invented certain new and useful Improvements in Central-Station Heating Systems, of which the following is a specification.
Our invention is an improvement in central-station heating systems; and it consists in the construction, combination, and arrangement of parts hereinafter described and claimed. The principle involved is that of the Prall system of central-station heating, wherein heat for warming, cooking, and power purposes is supplied to large districts of buildings by means of superheated water or other circulating agents conveyed through underground mains, supply-pipes, &c., the circulation being maintained by force-pumps or other equivalent means.

In the following description reference is to be had to the accompanying drawings, forming part of this specification, in which similar letters of reference designate like parts throughout the several views.

Figure 9:
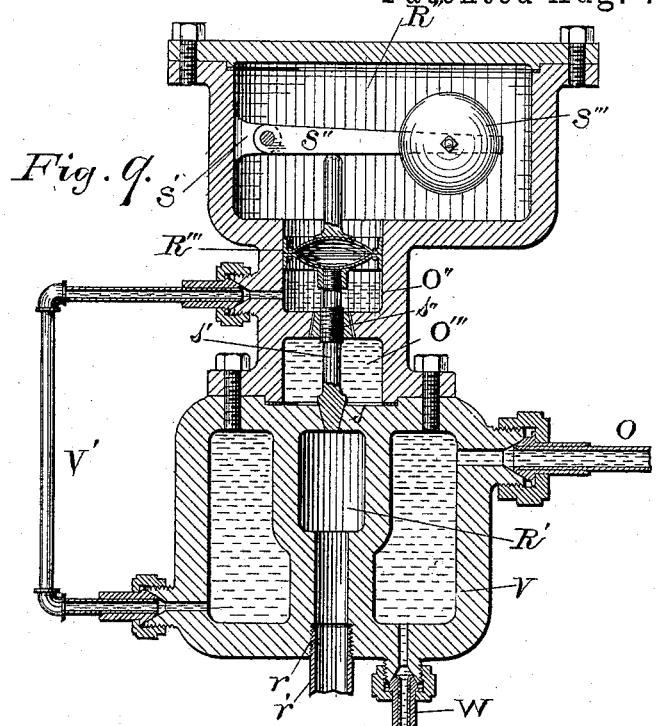
Figure 10:
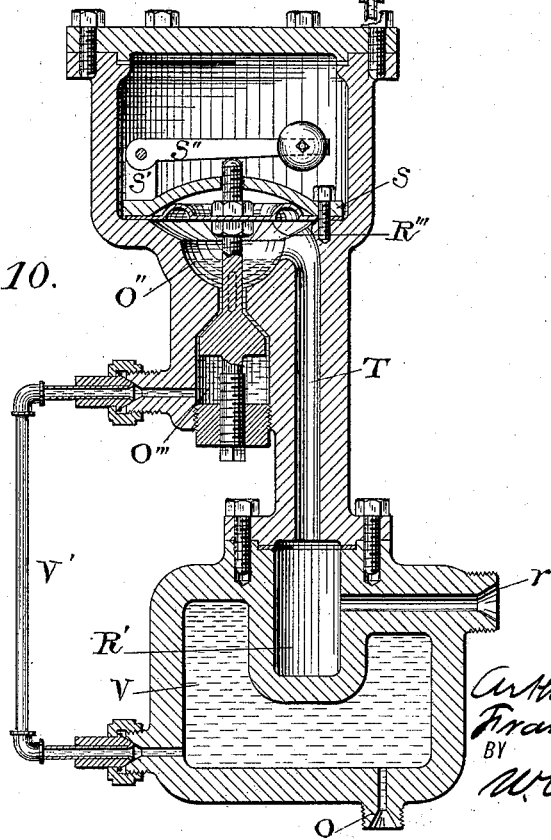

Figure 1 is a general perspective view of an apparatus involving our improvements. Fig. 2 is a perspective view of the house-connection, the casing for the valves, joints, &c., being broken away. Fig. 3 is a central vertical section of the house supply pipe, valves, &c., taken on the line $x$ $x$ of Fig. 2. Fig. 4 is a central vertical section of one form of converter and pressure-regulator, the plane of the section passing through the center of the supply-pipe. Fig. 5 is a central longitudinal vertical section of an expansion-joint and ball-valve.
Fig. 5ᵃ is a cross-section through the valve and valve-chamber shown in Fig. 5. Fig. 6 is a transverse section on the line $y$ $y$, Fig. 5. Fig. 7 is a vertical longitudinal section of a combined expansion and branch main joint or coupling. Fig. 8 is a transverse vertical section of the underground conduit, the supply and return mains, the bracket which supports the mains, and showing, also, other features of construction, the plane of the section being that of the line $z$ $z$, Fig. 1. Figs. 9 and 10 are central vertical sections of modified forms of converter and pressure-regulator.

Referring to Fig. 1, A is the heater or boiler where the water is superheated, and C C the supply-main, leading from the heater at C' and returning to the same at C''. A force-pump, B, is provided for the purpose of keeping up a circulation in the supply-main, which extends through one street and returns usually through another, and is connected with the heater at both ends, whereby a closed circuit is formed and the circulation made continuous.

The heater should be of sufficient capacity to furnish all the water necessary to supply heat for any purpose whatever to the district reached by the circulating-main. The heater may be supplied by means of a force-pump connected with the ordinary water-main of the street, or in any other desirable way, with water in such quantities as may be desired to supply the place of that taken from the main C for any purpose or by any means whatever. The power for driving the pumping-engine may be taken from steam generated in the heater or from a boiler erected for the purpose.

It is evident that there may be several heaters employed for the purpose of supplying water for circulation, and they may all be connected, or they may be separated by means of cocks placed in the connecting-pipes, so that one or more of them may be used independently of the others.

The hot-water mains are to be covered with a considerable thickness of some non-conducting substance, such as asbestus, wool, and paper, or other non-heat-conducting material, and are inclosed in a strong water-tight rectangular box of wood, or in a strong hooped cylindrical box of wood; or a brick or stone conduit may be employed. A section of the latter form is shown in Fig. 8. The essential features of the conduit are that it has a considerable free space between it and the contained pipe, that it be water-tight, or as nearly so as possible, and that it be strong enough to sustain a moderate internal pressure. All these details, however, form no part of the present invention, which relates to the construction of the expansion-joints, the combination expansion and branch main couplings and valves, the supports for the supply and return mains within the conduit, the manner of and means for connecting the supply and return mains with the converter within the house or other building to be heated, and other features of construction relating and pertaining thereto.

In this system of heating, the water of condensation, instead of being conducted from the steam-trap into the sewers after it has passed through the radiators and possesses no further heating-power, is conducted back to the heater by means of return pipes, mains, &c., and, being again heated to the required temperature, is again circulated through the supply-main for heating purposes. The means for doing this consist of a return-main, D, laid parallel with and immediately under the supply-main, and branch return-mains and return-pipes which correspond with the branch supply-mains and supply-pipes connected with the supply-main. Both ends of the return-main are connected with a return water-tank, D', situated in proximity to the heater, and a force-pump, D'', is employed for forcing the water from the said tank into the heater. In construction, protection, &c., the return mains and pipes are in all respects similar to the supply mains and pipes, the only difference being that the strength of the latter must necessarily be much greater than that of the former, in order that they may withstand the much greater pressure to which they are subject in this system because of the high temperature at which the heating medium is circulated.

Having now described the main features of the system, we will proceed to set out the features thereof to which our invention more particularly relates.

The supply and return mains C and D are usually placed in an underground conduit and are connected with the heater and return water-tank, as shown and described, the latter, together with the force-pumps and other portions of the system pertaining thereto, being located in a building constructed for that purpose. At suitable points along the lines of the mains, usually at the junction of the streets, are arranged combination expansion and branch main couplings E and bracket-supports F, and expansion and automatic valve-couplings G—the latter being applied to the supply mains and pipes only—are placed wherever necessary. The supply-mains are also provided with ordinary gate-valves, H, as shown, and these valves may also be applied to the branch supply mains and pipes wherever desired. Flanges or wings are also formed upon the bottom of the coupler, by which it may be bolted or secured to the base of the conduit. The construction of the first of these couplings is that shown in Fig. 7. The main body of the coupling E is cast in a single piece, and is provided with two longitudinal bores, E' and E'', as shown, with which the supply and return mains respectively connect, and with two transverse bores or passages, with which the branch supply-main c and branch return-mains d communicate. At one end of this coupling—in this case on the left of the figure—the mains C and D are connected with the coupler in any desired manner. At the other end, however, each of the bores E' and E'' are enlarged, as shown at e and e'. A rib or flange, e'', separates the enlarged chambers e and e'. Attached to the supply and return mains C D are brass slips or tubes K, and surrounding these are heads L, which fit within the enlargement e' of the main bores, and are provided with flanges L', by means of which the heads may be bolted to the coupler, as shown. A flange, L'', is also formed on the head L, attached to the supply-main, which is somewhat larger than the tube or slip K, and within which is placed a packing, l, of asbestus or other suitable material.

K'' is a brass ring or wiper provided with a flange which presses upon the packing l, and a head or flange by which it is bolted to the head L. The space or chamber e' is also provided with packing similar to that at l.

The means by which the branch mains are attached to the coupler are the same as those above described, and their illustration in section and detail description are not therefore deemed necessary. By this construction the free and easy expansion of the mains is secured and a perfectly tight joint provided. The object in forming the slips or tubes K and the wiper or band K'' of brass is to prevent the formation of rust and to permit of the ready movement of the parts in the expansion and contraction thereof.

The ball-valve shown in Figs. 5 and 5ª is placed in a circular chamber, as shown, in the lower part of which are inclined longitudinal ribs or ways, upon which the valve rests. These ribs are deepest at the center and taper gradually to the lower edge of the pipe-openings at each end of the chamber. Each of said openings may be large enough to admit the valve, and valve-seats may be formed upon the end of each pipe; or the construction may be that shown in Fig. 5, in which a valve-seat is formed at one side of the chamber and on the end of the main or pipe on the other side. In either case the valve can be inserted before the pipe is screwed in. By this construction of chamber and valve the water or other heating medium is permitted to flow entirely around the valve, which is so graded in weight as to remain in the center of the chamber when the water or other fluid is flowing normally; but in case of a rupture or other breakage of the main the pressure on the side opposite the break will be sufficient to throw up the valve and cut off the flow. By allowing the hot water or other heating medium to flow freely underneath and on all sides of the valve the valve-chamber is kept clean and the deposition of any and all substances prevented. This form of valve and coupling may be located wherever desired along the supply and branch supply mains. It is not claimed specifically herein, but is made the subject of a separate application filed by us July 30, 1887, Serial No. 245,677.

The construction shown in Fig. 8 involves a bracket, M, for holding the mains in position, means for securing the same to the bottom of the conduit, and means for admitting of the easy movement of the mains under the process of expansion and contraction. The conduit shown consists of double brick walls and a concrete base, to which the bracket is bolted. The bracket M is provided with a cap, M', and between the bottom or main portion and the cap M' is formed a circular space or opening, through which the supply-main C passes, and in the bottom of said opening is placed a roller, $m$, constructed as shown, upon which the main rests. The lower part of said bracket is also open, the upper part of the opening being circular in form, and through this opening passes the return-main D. The bracket is also provided with bottom flanges or wings, by which it is bolted to the bottom of conduit, metal plates being placed beneath or in the concrete substance forming said bottom for this purpose, and vertical side ribs or flanges, which add strength thereto. A plate, $m''$, is also bolted to the concrete bottom of the conduit within the sides of the bracket M, and this plate is provided with vertical notched lugs, which support a second roller, $m'$, upon which the return-main D rests. The central portion of the plate $m''$ is cut away to admit of the movement of the roller $m'$. Arranged centrally along the bottom of the conduit is a channel for carrying off any water that may collect therein. This channel may be connected by means of pipes $m'''$ with the street-sewer. Of course the conduits, supports, branch connections, &c., for the branch mains are the same as those hereinbefore described, and the branch mains, after passing through the district to be heated, are returned to and connected with the mains in the same manner.

Having now described the general features of the system and the details thereof relating to the underground street-mains, branch mains, and their connection with each other, we will now point out and describe the means by which the superheated water is conducted from the supply-main into the house, converted into steam when steam is used as a heating medium, and the water of condensation returned to the return-main. For this purpose a supply box or housing, N, preferably of metal and of the general form shown either in Fig. 1 or 2, is placed in a space prepared therefor beneath the pavement, and usually in such a position that two houses may be supplied by branch pipes leading therefrom. Within this box or housing are brackets or ways $n'$, which may be formed either on the sides or back of the housing or attached thereto in any desirable way. The sides of the housing are provided with longitudinal slots N' and N'', as shown. In the bottom thereof is placed a block, N''', which is preferably provided with a horizontally-concaved upper surface. A plate, $n''$, rests upon the ways $n'$, and is also provided with a horizontally-concaved upper surface. A supply-pipe, $c'$, extends from the main C, and a return-pipe, $d'$, from the return-main D. Attached to the inner end of pipe $c'$ is a T-connection, $c''$, which is convex on its under surface and rests upon the horizontally-concaved surface of plate $n''$. The pipe $d'$ is also provided with a T-connection, $d''$, which is also provided with a convex surface on its lower side.

House-supply pipes O connect with head $c''$, as shown in Figs. 2 and 3, and each is provided with an asbestus or other suitable cock, O', in order that the supply from either or both may be cut off when desired. Return-pipes P connect with the head $d''$ in the usual way.

By this construction a free movement of the heads $c''$ and $d''$ forward and back and laterally is provided for, and the slots N' and N'' also admit of the movement of the pipes O and P in the sides of the box or housing N. The pipes $c'$ and $d'$ and O and P will usually be quite short, and by means of the construction shown ample provision is made for their expansion and contraction. Of course expansion-joints similar to those herein described may be placed in each, if desired.

The means for utilizing the superheated water for heating purposes within the building consist of a converter, an automatic differential-pressure regulator, steam and water pipes, radiators, a meter, and a tank to receive the water of condensation, from which it is returned to the return-main.

The converter and regulator are shown at O' in Fig. 1 and in central vertical section in Fig. 4. As shown in Fig. 4, the regulator consists of a casting, R, having a cap bolted thereto, and is itself secured to the converter R', which in this case consists of a chamber cast in a single piece, with an opening in the top for the admission of water and an opening, $r$, in the side, at which point the steam-pipe $r'$, leading to the radiators, is attached.

The casting R is provided with an enlarged chamber, R'', in the top thereof, the bottom of which is hollowed out, forming an auxiliary chamber, O'', which communicates by means of a passage, $o$, with a chamber, O'''. This chamber has an open bottom and a side passage, with which the supply-pipe O communicates. The opening in the bottom of chamber O''' is closed by a head or nut, $o'$, which is provided with a screw, $o''$. Arranged within the chamber R'' is a diaphragm, R''', and upon or above this diaphragm is placed a convexo-concave disk, S, which is provided with an opening in the center thereof. This disk is provided with an upwardly-projecting lug, S', to which is pivoted a lever, S", provided with a weight, S'''. Arranged within the chamber O''' is a valve, s, provided with a valve-stem, s', which passes through the center of the diaphragm R''', and is secured thereto by an upper and lower nut, as shown. The lever s" rests upon the upper end of this valve-stem, to which it may be movably secured in any desired manner. The purpose of the screw o" is to properly locate the valve s. The diaphragm R''' is made of metal, preferably of brass, and is capable of vertical movement. By providing the chamber R" and having a removable top attached thereto the weighted lever and other elements of construction connected therewith are securely protected and the danger resulting from the bursting of the diaphragm and its inclosing-plate, if the same occur, is avoided.

The operation is as follows: The heater A being filled with water and heated to a high degree—for example, say 332° Fahrenheit, which would give a pressure of about one hundred pounds to the square inch—and be kept at that point, which would be one hundred and twenty degrees above the steam-generating point, and if the connection at both ends of the supply-main be open, the pressure upon said main and the water therein will be the same as upon the water in the heater, and if the force-pump be put in motion the water will be forced through the main at about a temperature equal to that in the heater. If now the cocks in the supply-pipe be opened, the hot water under pressure will be forced through the supply-pipe into the chamber O''', and will rise in said chamber and flow therefrom through the passage T into the converter R', where it will instantly expand into steam because of the great reduction of pressure, as it contains many degrees of heat above the steam-generating point, as above mentioned. Suppose, now, it is desired to employ the steam for heating purposes at a pressure of, say, fifteen pounds to the square inch. The weight S''' on the lever S" is in this instance so placed as to admit of fifteen pounds pressure upon the diaphragm R''' before the same will be moved by the pressure of the steam in the converter R'. As soon, however, as the pressure of the steam in the converter is greater than fifteen pounds to the square inch, the diaphragm will raise the valve stem and valve against the pressure of the weighted lever, and the valve will cut off the flow of hot water into the chamber O" and converter R'. As soon, however, as enough of the steam has escaped into the steam-pipe to reduce the pressure in the converter below fifteen pounds, the weighted lever will operate to open the valve s and admit the water to the converter, when it is converted into steam, and the operation above described is repeated as long as the cocks in the supply-pipes are open. The steam is conducted by means of a pipe, r', to the radiators for heating purposes and the water of condensation returned through pipe P" to the return water-tank P', from which it is conveyed to the return-main by means of pipes P and c', and thence through the return-main to the tank D', from which it is pumped into the heater A by pump D", where it is again raised to the required temperature and again circulated through the supply-main C. If, because of the irregular surface of the street in any particular plant or system, or for any other reason, the difference in the temperature of the circulating medium in the supply and return mains will not cause a circulation in the latter or cause the water therein to return to the heater, force pumps may be applied to the return-main at any point desired.

For the purpose of determining the exact amount of heat consumed by each customer, we employ any well-known water-meter, U, with which the return-water pipe communicates after leaving the tank P'. The condense water discharged through this pipe and meter will always bear the same unvarying relation to the amount of steam produced in the converter R' under a given pressure, and it will thus be an easy matter to calculate thereby the number of cubic feet of steam or units of heat consumed.

In Figs. 9 and 10 we have shown modified forms of converters and regulators. In Fig. 9 the converter R' is surrounded by a hot-water chamber, V, into which the water enters from the branch supply-pipe O. From this chamber the water passes by means of a pipe, V', into the chamber O". Instead of a diaphragm, we employ a double elastic piston, R''', which is convexo convex in form, and is composed of two copper plates united, as shown, the outer edge of the upper plate being bent upward and the outer edge of the lower plate being bent downward, the said bent portion forming a bearing-surface for the piston. A hot-water chamber is formed between the chamber O" and the converter, and the stem s' is provided with two valves, s and s", as shown. The chamber O''' might evidently be omitted.

The operation is as follows: The superheated water enters the chamber V, passes by means of pipe V' into chamber O", the valve s" being open and the valve s being closed, the chamber O''' and O" will be filled until the pressure on the piston R''' is sufficient to raise the valve-stem against the force of the weighted lever, when the valve s" will be closed and the valve s opened. The water will then pass into the converter and be converted into steam, as in Fig. 4, which will be conducted by the pipe r' to the radiators. As soon as the water in chamber O''' is vaporized the weighted lever will open valve s" and close valve s, and the above operation will be repeated. The size of the piston and the location of the weight on the lever are such that the pressure of the water alone in chamber O" on the piston can never keep the valve s" closed. This can only occur when each of the chambers O" and O''' are filled and the pressure of the superheated water operates both upon the piston and valve $s''$.

The construction shown in Fig. 10 is the same as that of Fig. 4, with the exception that the converter is partly surrounded with a hot-water chamber, as in Fig. 9, into which the water enters by means of pipe O, and from which it passes to chamber $O'''$ through pipe $V'$. By surrounding the converter with a hot-water chamber, as in Figs. 9 and 10, the temperature of the converter is kept many degrees above the steam-generating point, and the rapid and complete evaporation of the water is thus assured and the condensation thereof prevented. Of course the water-chamber may be applied to the form shown in Fig. 4, if necessary. If desired, these hot-water chambers may be connected with the supply-main by means of pipe W, the same as in the Prall system referred to, and a complete circuit between the said chambers and the supply-main thus established. The pipe W is shown only in Fig. 9; but it is evident that the same may be applied to the water-chamber V in Fig. 10, if deemed necessary.

In addition to supplying steam or hot water for heating and cooking purposes, as herein shown and described, it is evident that this system may be employed for the purpose of supplying steam or hot water for power purposes, propelling street-cars by charging receiving-tanks located thereon with hot water at intervals along the line, stations being provided for that purpose; also, running stationary engines for any and all purposes wherever an engine may be located in proximity to the circulating mains and pipes.

Having fully described our invention, its construction and mode of operation, what we claim, and desire to secure by Letters Patent of the United States, is—

1. In a heating system, the combination of a superheater, a supply-main, a force-pump, an expansion joint or coupling provided with a double-acting check-valve, and means for conducting water from the supply-main into a house or other building and utilizing the same for heating purposes.

2. In a heating system, the combination of a superheater, a supply-main, a force-pump, expansion joints or couplings, a supply-pipe, a housing, N, branch pipes leading from said supply-pipe to different houses, a converter and regulator with which the branch supply-pipes communicate, and a radiator connected with the converter, substantially as shown and described.

3. In a heating system, the combination of a heater, a supply-main, a force-pump, a supply-pipe leading from the supply-main, a movable coupling, $c''$, pipes leading from said coupling to a regulator and converter, a regulator and converter, and radiators, substantially as shown and described.

4. In a heating system, the combination of a superheater, a supply-main, a force-pump, a supply-pipe leading from said main, a box or housing, N, a movable coupler or T-head attached to said supply-pipe and located in said box or housing, and branch pipes leading from said coupler to the buildings to be heated, substantially as shown and described.

5. In a heating system, the combination of a superheater, a supply-main, a force-pump, a supply-pipe, a box or housing into which said supply-pipe extends, a coupler attached to said pipe within said housing, and a branch pipe or pipes leading from said coupler into the house or houses to be heated, substantially as shown and described.

6. In a heating system, the combination of a heater, a supply-main, a force-pump, a supply-pipe, a housing into which said supply-pipe extends, a coupler within said housing, a branch pipe or pipes attached to said coupler and extending out of said housing into a building or buildings to be heated, a regulator and converter, and a radiator or radiators, substantially as shown and described.

7. In a heating system, the combination, with a heater, supply-main, and a force-pump, of a box or housing located beneath the sidewalk, said box being provided with ways or bearings, and a plate, $n''$, resting thereon, a supply-pipe extending from the said main into said housing, a coupling attached to said supply-pipe and resting movably upon the plate $n''$, and branch supply-pipes communicating with said coupling and extending into the house or houses to be heated, substantially as shown and described.

8. In a hot-water heating system, the combination of a superheater, a supply-main, a force-pump, a box or housing provided with side openings, $N'$, as shown, a supply-pipe leading from the main into said housing, a coupler and branch supply-pipes leading from said coupler through said openings into the building to be heated, substantially as shown and described.

9. In a hot-water heating system, the combination of a heater, a supply-main, a force-pump, a box or housing provided with side openings, $N'$, and ways or brackets $n'$, as shown, of a plate at $n''$, resting on said ways, a coupler resting on said plate, a supply-pipe connecting the main and coupler, and branch supply-pipes leading from said coupler into the building or buildings to be heated through the openings $N'$, substantially as shown and described.

10. In a hot-water and steam-heating system, the combination of a heater, a supply-main, a force-pump, a housing, N, provided with ways or brackets $n'$, a plate, $n''$, having a longitudinally-concaved upper surface, a coupler, $C''$, having a convexed lower surface resting on said plate, a supply-pipe connecting the main and coupler, and a branch pipe or pipes leading from the coupler to the building or buildings to be heated, substantially as shown and described.

11. In a hot-water circulating system, the combination of a superheater, a supply-main and force-pump, an automatic double-acting check-valve located in the supply-main, a return-main, a return water-tank, and a pump for forcing the water from the tank into the heater, substantially as shown and described.

12. In a central-station heating system, the combination of a heater, a supply and a return main, a bracket at M, having an upper and lower opening, and a removable cap and revoluble supports in said openings, whereby the mains are permitted to move freely in the direction of their lengths, substantially as shown and described.

13. In a central-station heating system, the combination of a heater, a supply and a return main, a bracket at M, having upper and lower openings, a removable cap for the upper opening, and revoluble supports for the mains in said openings, said bracket being secured firmly to its support, whereby said mains are held in place and their free longitudinal movement provided for, substantially as shown and described.

14. In a hot-water circulating system, the combination of a superheater, a supply-main, a force-pump therefor, a return-main, a supply-pipe, a box or housing, a movable coupling within said box, a branch supply-pipe leading from said movable coupling to the house to be heated, a branch return-pipe leading from the house to the said box and provided with a movable coupling therein, and a return-pipe leading from said coupling to the return-main, substantially as shown and described.

15. In a hot-water circulating system, the combination of a superheater, supply and return mains, a force-pump, supply and return pipes, branch supply and return pipes, and a box or housing within which the supply and return pipes and branch supply and branch return pipes connect, substantially as shown and described.

16. In a hot-water circulating system, the combination of a heater, force-pump, supply and return pipes, a housing within which the supply and return pipes connect with branch supply and return pipes, regulator and converter, a radiator or radiators, a condense-water tank, and connecting-pipes, substantially as shown and described.

17. In a hot-water circulating system, the combination of a heater, supply and return mains provided with expansion-joints, force-pumps, supply and return pipes, movable couplings, a housing containing the couplings, branch supply and return pipes, a regulator and converter, and radiators and connecting-pipes, substantially as shown and described.

18. In a hot-water and steam-heating system, the combination, with the supply-main, of an automatic pressure-regulator provided with a steam or converting chamber, said chamber being surrounded by a hot-water chamber, the supply-main, hot-water chamber, the regulator, and steam or converting chamber being in communication with each other, substantially as shown and described.

19. In a hot-water heating system, an automatic pressure-regulator provided with a steam or converting chamber, said chamber being partially inclosed by a hot-water chamber, the hot-water chamber, regulator, and steam or converting chamber being in communication, substantially as shown and described.

20. An automatic differential-fluid pressure regulator consisting of a casing provided with chambers R″ O″ O‴, a piston, R‴, provided with a valved stem, $s'$, and a weighted lever, S″, in combination with a converter, R, provided with the chamber R′, and a pipe or passage communicating with the chamber O″ of the regulator, as shown and described.

Signed at the city of New York, county and State of New York, this 24th day of August, 1887.

ARTHUR V. ABBOT.
FRANK C. F. KNAAK.

Witnesses:
DANIEL E. DELAVAN,
L. L. DUERDEN.